United States Patent [19]

Eaves

[11] Patent Number: 4,552,192
[45] Date of Patent: Nov. 12, 1985

[54] CUTTING TOOL MECHANISM

[76] Inventor: Thomas P. Eaves, 262 Lake St., Apt. 2-W, Bloomingdale, Ill. 60108

[21] Appl. No.: 502,688

[22] Filed: Jun. 9, 1983

[51] Int. Cl.$^4$ .............................................. B07D 1/00
[52] U.S. Cl. ............................ 144/136 C; 144/136 D; 30/371; 30/372; 30/374; 30/375
[58] Field of Search ........... 144/136 R, 136 C, 136 D; 83/745, 574; 145/4, 4.1, 4.2, 129; 308/3 A; 30/371, 372, 374, 375

[56] References Cited

U.S. PATENT DOCUMENTS

| | | | |
|---|---|---|---|
| 1,532,089 | 3/1925 | Teepell | 145/19 |
| 1,883,392 | 10/1932 | Moll | 144/136 C |
| 3,953,086 | 4/1976 | Chaffin | 308/3 A |
| 4,202,233 | 5/1980 | Larson | 83/745 |
| 4,343,088 | 10/1982 | Farley et al. | 83/745 |

Primary Examiner—W. D. Bray
Assistant Examiner—Jorji M. Griffin
Attorney, Agent, or Firm—Wood, Dalton, Phillips, Mason & Rowe

[57] ABSTRACT

A cutting tool mechanism including a slide member, a track member slidably guiding the slide member along a preselected path, a saw, and structure associated with the slide member for mounting the saw thereto. The mechanism includes structure for directing the user's hands away from the saw blade in the use of the mechanism, including a pair of handles at opposite sides of the saw mounting structure. The axis of the saw is disposed at a small angle to the slide plane, and to the direction of guided movement. Adjustable slide elements are mounted to the slide member for adjusting the disposition of the slide member on the track member. Adjustable track followers are adjustably mounted to the slide member for maintaining accurate guided fit of the slide member on the track member.

18 Claims, 5 Drawing Figures

U.S. Patent  Nov. 12, 1985  4,552,192
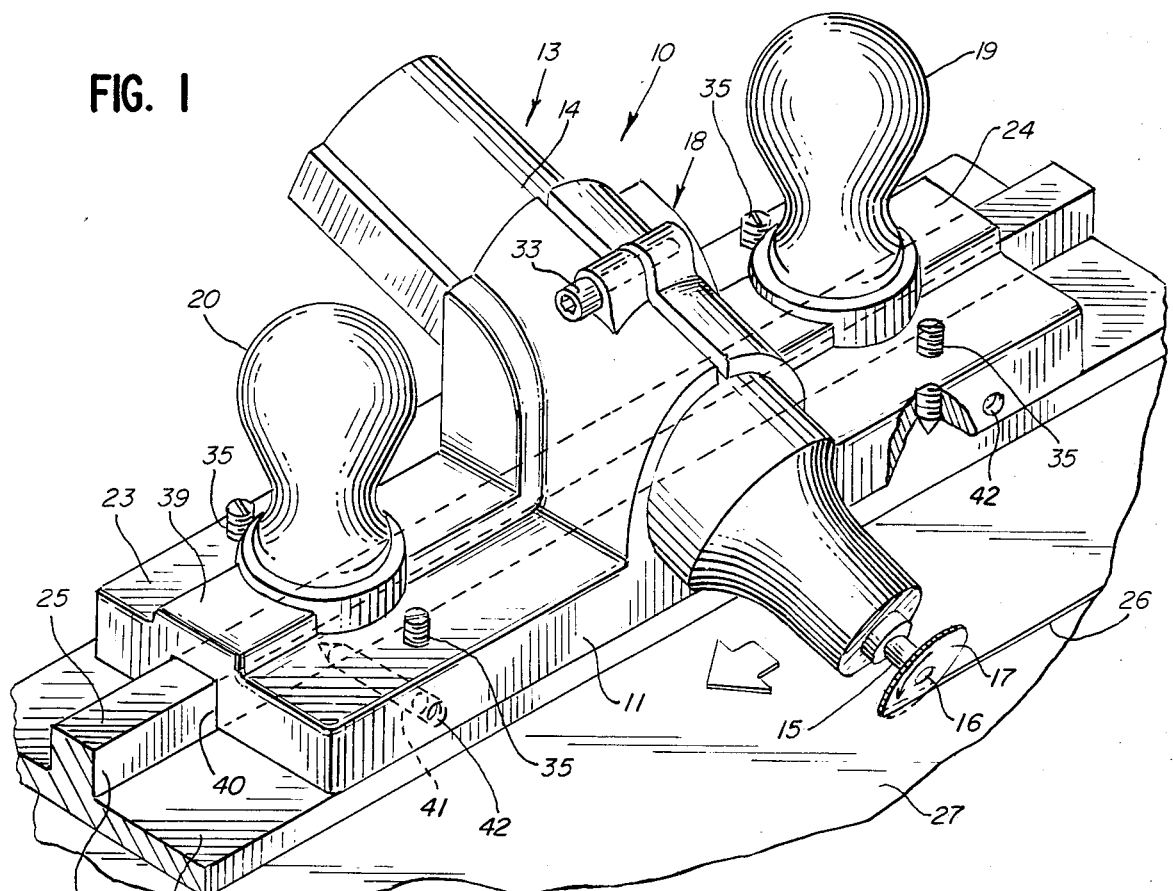
FIG. 1
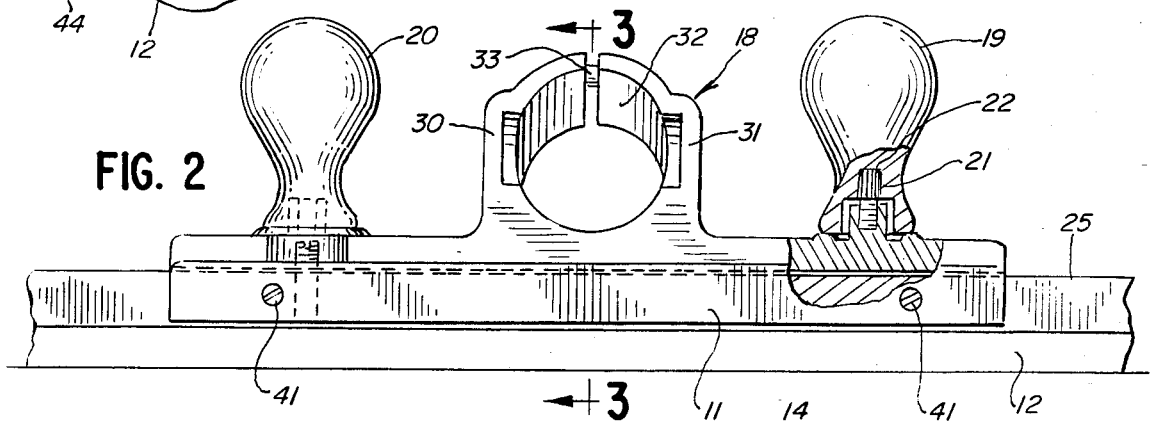
FIG. 2
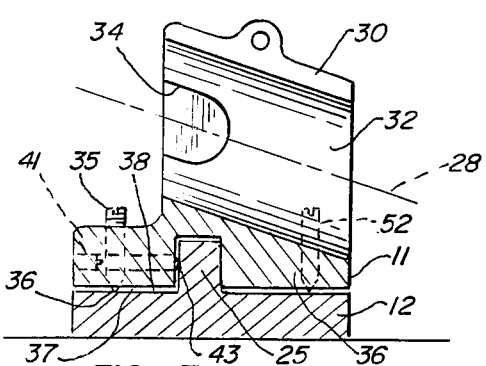
FIG. 3
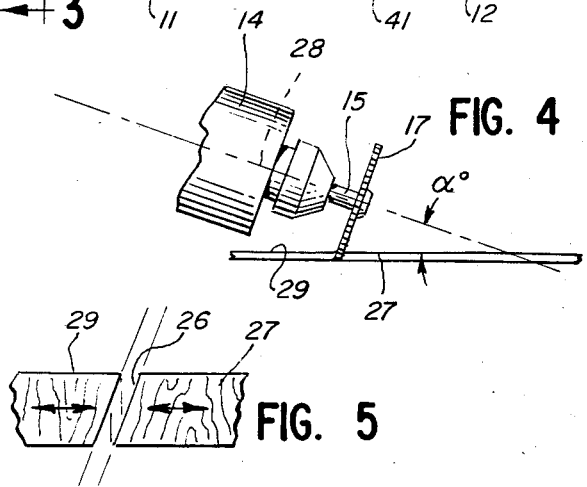
FIG. 4
FIG. 5

CUTTING TOOL MECHANISM

BACKGROUND OF THE INVENTION

1. Field of the Invention

This invention relates to veneering and in particular to tool mechanisms for use in veneering.

2. Description of the Background Art

It has been conventional to joint veneers by means of special saws and power-operated guillotines in production veneering operations. In custom veneering, knife cutting is conventionally done, but presents a serious problem in inaccurate guiding and, resultingly, in inaccurate cuts so as to result in inaccurate veneer joints.

Single leaves are conventionally planed on the shooting-board and packs of veneers are conventionally clamped between wood straight-edges, or held in a vice, or passed over a planer. Because of a tendency to splinter at the planed edges, it has been conventional to apply strips of adhesive tape thereto temporarily during the planing operation.

Finger jointing is conventionally effected as a hand process, whereas wedge joint veneering is conventionally effected by shaping machines working on the principle of a fly-press.

A conventional method of jointing veneers is to clamp a straight-edge lengthwise on top of the veneer, one piece at a time, and to trim the veneer edge by means of a conventional manually operated veneer saw. Each edge of each piece to be joined is trimmed in this manner.

Alternatively, a simpler method of veneering provides an overlap of approximately ½" for later trimming. The overlap is disposed on top of a previously applied veneer sheet. The overlap portion tends to raise itself above the surface of the previously applied sheet and is subsequently sanded off flush or carefully trimmed with a veneer saw.

There has long been a need for a low cost, easily operated cutting tool which will provide a highly accurate veneer joint.

SUMMARY OF THE INVENTION

The present invention comprehends the provision of such an improved cutting tool which is inexpensive while yet providing highly accurate veneer cuts.

More specifically, the invention comprehends the provision of such a cutting tool mechanism including a slide member, a track member for slidably guiding the slide member along a preselected path, a saw having a power drive, a drive shaft driven by the power drive, and means at the distal end of the shaft for coaxially mounting a rotary saw blade thereto, means for mounting the power drive to the slide member with the shaft cantilevered therefrom, and means for directing the user's hands away from a saw blade mounted to the shaft in the use of the mechanism comprising a pair of mechanism-guide handles associated with the slide member one each on opposite sides of the power drive mounting means.

In the illustrated embodiment, the handles are removably secured to the slide member adjacent opposite ends thereof and in aligned relationship with the track member.

In another aspect, the invention comprehends the provision of a cutting tool mechanism including such a slide member, track member, saw, and means for mounting the power drive of the saw to the slide member, and additionally, means for causing a saw blade mounted to the shaft to cut an elongated veneer edge in a workpiece comprising means forming a portion of the mounting means for positioning the axis of the power drive shaft at an angle of approximately 15° to said slide plane and at an angle to the direction of guided movement of the slide member on the track member.

In the illustrated embodiment, the mounting means comprises clamp means permitting axial adjustment of the power drive therein.

The positioning means in the illustrated embodiment comprises means for positioning the power drive axis at a single preselected angle to the slide plane and to the direction of guided movement of the slide member on the track member.

In the illustrated embodiment, the cutting tool mechanism includes means for adjusting the disposition of the slide member on the track member comprising slide elements mounted to the slide member having projecting distal ends defining the slide plane.

The slide elements, in the illustrated embodiment, comprise elements adjustably threaded to the slide member and are formed of a low friction material, such as a synthetic resin. The slide elements, in the illustrated embodiment, are threaded to the slide member at opposite edge portions thereof.

The invention further comprehends the provision of such a cutting tool mechanism including means for causing accurate conformity of the slide member movement to the preselected path comprising an upstanding track on the track member, means defining a complementary groove on the slide member embracing the track, and a plurality of track followers adjustably mounted to the slide member for slidably engaging the track with an accurate sliding fit therebetween.

In the illustrated embodiment, the track followers comprise elements adjustably threaded to the slide member at one side thereof for engaging one side of the upstanding track.

In the illustrated embodiment, the track followers are formed of a low friction material, such as synthetic resin.

The cutting tool mechanism of the present invention is extremely simple and economical of construction while yet providing facilitated highly accurate veneer edge cutting in a novel and simple manner.

BRIEF DESCRIPTION OF THE DRAWING

Other features and advantages of the invention will be apparent from the following description taken in connection with the accompanying drawing wherein:

FIG. 1 is a perspective view of a cutting tool mechanism embodying the invention, with portions broken away for facilitating illustration of the tool mechanism structure;

FIG. 2 is a front elevation thereof, with a portion broken away to illustrate the mounting of a handle to the slide member;

FIG. 3 is a vertical section taken substantially along the line 3—3 of FIG. 2;

FIG. 4 is a fragmentary side elevation illustrating the angularity of the drive axis and saw; and FIG. 5 is a fragmentary enlarged vertical section illustrating the overlap joint produced by the tool mechanism.

DESCRIPTION OF THE PREFERRED EMBODIMENT

In the illustrative embodiment of the invention as disclosed in the drawing, a cutting tool mechanism generally designated 10 is shown to include a slide member 11, a track member 12 for slidably guiding the slide member along a preselected rectilinear path, a saw generally designated 13 having a power drive 14, a drive shaft 15 driven by the power drive 14, and connecting means 16 at the distal end of the shaft for coaxially mounting a rotary saw blade 17 thereto.

Mechanism 10 further includes mounting means generally designated 18 for mounting the power drive 14 of saw 13 to the slide member 11 with the shaft 15 cantilevered therefrom.

The invention comprehends the provision in tool mechanism 10 of means for directing the user's hands away from the saw blade in the use of the mechanism, and more specifically, as illustrated in FIGS. 1 and 2, includes a pair of mechanism guide handles 19 and 20 associated with the slide member one each on opposite sides of the power drive mounting means 18.

In the illustrated embodiment, the handles are removably secured to slide member 11 by retaining pins 21 threadedly secured to the slide member and received in suitable recesses 22 in the handles.

As shown, the handles are secured to the slide member adjacent opposite ends 23 and 24 thereof in aligned relationship with an upstanding track 25 on the track member 12. As further shown, saw mounting means 18 is arranged to cause the saw blade 17 to cut an elongated veneer edge 26 in a workpiece 27 for positioning the axis 28 of the power drive shaft at an angle of approximately 15° to the slide plane defined by the upper surface 29 of the workpiece. Additionally, the mounting means is arranged to dispose the power drive shaft axis 28 at a small angle to the direction of guided movement of the slide member on the track member, i.e. lengthwise of track 25. This places the leading portion of the saw blade only at the edge of the final veneer sheet, with the trailing edge of the blade engaging the portion of the sheet to be discarded. Such arrangement effectively eliminates any tendency of the saw to bind at the trailing edge and provides an improved clean, accurate cut.

The mounting means of tool mechanism 10 is shown to comprise a clamp means permitting axial adjustment of the power drive therein at the preselected angle, as discussed above. As shown in FIG. 2, the clamp mounting means 18 includes a pair of upstanding clamp halves 30 and 31 defining a cylindrical socket 32 for receiving the power drive 14. A clamp screw 33 is threaded to the clamp halves for forcibly tightening the clamp halves about the inserted saw and power drive portion 14, as illustrated in FIG. 1.

The clamp halves may be provided with means for accommodating at least one projecting portion of the power drive and, in the illustrated embodiment, as shown in FIG. 3, are provided with recesses 34 at the rear of the clamp portions for accommodating the motor brushes of the power drive. The recesses are preferably accurately located so as to further define means for automatically axially positioning the saw so that the saw blade is at a preselected distance forwardly of the front edge of the slide member. In the preferred embodiment, the positioning is suitable to locate the cooling air inlet for the power drive forwardly of the mounting means 18. In the preferred embodiment, the axial length of the clamping means is less than the space in between the cooling air inlet and the air outlet at the rear of the power drive, so that each of these openings may be exposed when the saw is properly mounted in the slide member clamp means.

The invention further comprehends the provision of means for adjusting the disposition of the slide member on the track member to accommodate any wear in the sliding surfaces therebetween. More specifically, as shown, a plurality of slide elements 35 are adjustably mounted to the slide member and define downwardly projecting distal ends 36 defining the flat slide plane of the slide member. Thus, as seen in FIG. 3, distal ends 36 of the slide elements effectively space the lower surface 37 of the slide member 11 upwardly from the upper surface 38 of the track member. As shown, the slide elements 35 are threaded through the slide member and are disposed one each at the four corners of the slide member (FIG. 1).

Thus, the slide elements may be readily axially adjusted to provide accurate parallel relationship of the slide member with the underlying support, notwithstanding wear on the confronting surfaces. In the illustrated embodiment, the slide elements are formed of a low friction material, such as a synthetic resin. Illustratively, the slide elements may be formed of nylon.

In the illustrated embodiment, the slide member is provided with a longitudinal central offset portion 39 defining a downwardly opening channel 40 slidably embracing the track 25 of track member 12. The invention comprehends the provision of adjustable track follower means 41 for maintaining accurate sliding fit of the slide member to the track. More specifically, the track follower means comprises a pair of track followers 41 adjustably mounted to the slide member for slidably engaging track 25. In the illustrated embodiment, the track followers comprise threaded elements adjustably received in threaded bores 42 extending horizontally through the front portion of the slide member, as illustrated in FIG. 1.

In the illustrated embodiment, the track followers are formed of a low friction material and define distal ends 43 slidably engaging the front side surface of the track 25 to provide the desired accurate sliding fit. In the illustrated embodiment, the track followers are formed of a low friction, synthetic resin, such as nylon.

Use of the saw mechanism 10 assures the provision of a highly accurate veneer edge cut for improved veneering. The provision of the angled cut 26 provides an automatic overlap of the juxtaposed veneer edges so that a slight separation in the veneer sheets will not be noticeable.

The use of the handles on opposite sides of the saw tends to stabilize the sliding movement of the slide member on the track member by permitting force application both in front of and behind the cutting point so as to further provide facilitated veneer edging. The adjusting elements 35 and 41 assure maintained accurate disposition of the saw blade as desired, notwithstanding wear of the sliding surfaces and, thus, provides long troublefree life of the mechanism.

In the illustrated embodiment, the slide member comprises an aluminum casting. The clamp means 18 is adapted, illustratively, for supporting electrical tools, such as the Model 270 tool manufactured by Dremel Manufacturing Co. Such adaptation, however, is exemplary only, as it will be obvious to those skilled in the art that the clamping means may be adapted for suitably securing any desired power drive means for effecting cutting operation of the saw blade.

The foregoing disclosure of specific embodiments is illustrative of the broad inventive concepts comprehended by the invention.

I claim:

1. A cutting tool mechanism comprising:
   a slide member defining a flat slide plane;
   a track member for slidably guiding the slide member along a preselected path;
   a saw having a power drive, a drive shaft driven by the power drive, and means at the distal end of the shaft for coaxially mounting a rotary saw blade thereto;
   mounting means for mounting the power drive to the slide member with said shaft cantilevered therefrom; and
   positioning means for causing a saw blade mounted to the shaft to cut an elongated veneer edge on the workpiece sheet and separate from the workpiece a portion to be discarded, said positioning means comprising means forming a portion of said mounting means for positioning the axis of said power drive shaft at a single preselected angle to said slide plane and at a preselected acute angle to the direction of guided movement of the slide member on the track member to cause the trailing edge of the saw blade to engage only the cut edge of the sheet portion being discarded.

2. The cutting tool mechanism of claim 1 further including means for directing the user's hands away from an exposed slide member saw blade mounted to the shaft distal end in the use of the mechanism comprising a pair of mechanism-guide handles associated with said slide member one each on opposite sides of said power drive mounting means and aligned with said track member to be disposed in substantially spaced relationship to said path of movement of the saw blade.

3. The cutting tool of claim 2 wherein said handles are removably secured to the slide member.

4. The cutting tool of claim 2 wherein said handles are removably secured to the slide member adjacent opposite ends thereof.

5. The cutting tool of claim 2 wherein said handles are removably secured to the slide member in overlying relationship with said track member.

6. The cutting tool mechanism of claim 5 further including means for adjusting the disposition of the slide member on the track member support plane surface comprising slide elements adjustably mounted to the slide member having projecting distal ends spaced from the slide member and cooperatively defining a slide plane of the slide member and having sliding engagement with said track member support plane surface.

7. The cutting tool mechanism of claim 6 wherein said slide elements comprise elements adjustably threaded to said slide member.

8. The cutting tool mechanism of claim 6 wherein said slide elements comprise elements adjustably threaded to said slide member formed of a synthetic resin.

9. The cutting tool mechanism of claim 6 wherein said slide elements comprise elements adjustably threaded to said slide member formed of a low friction synthetic resin.

10. The cutting tool mechanism of claim 6 wherein said slide elements comprise elements adjustably threaded to said slide member at opposite edge portions thereof.

11. The cutting tool mechanism of claim 5 further including means for causing accurate conformity of the slide member movement to said preselected path comprising an upstanding track on said track member, means defining a complementary groove on said slide member embracing said track, and a plurality of track followers adjustably mounted to said slide member for slidably engaging said track with said slide member in accurately preselected spaced relationship to said track member.

12. The cutting tool mechanism of claim 11 wherein said track followers comprise elements adjustably threaded to said slide member.

13. The cutting tool mechanism of claim 11 wherein said track followers comprise elements adjustably threaded to said slide member formed of synthetic resin.

14. The cutting tool mechanism of claim 11 wherein said track followers comprise elements adjustably threaded to said slide member at one side thereof for engaging one side of said upstanding track.

15. The cutting tool mechanism of claim 1 further including means for adjusting the disposition of the slide member on the track member support plane surface comprising slide elements adjustably mounted to the slide member having projecting distal ends spaced from the slide member and cooperatively defining a slide plane of the slide member and having sliding engagement with said track member support plane surface.

16. A cutting tool mechanism comprising:
   a slide member defining a flat slide plane;
   a track member for slidably guiding the slide member along a preselected path;
   a saw having a power drive, a drive shaft driven by the power drive, and means at the distal end of the shaft for coaxially mounting a rotary saw blade thereto;
   mounting means for mounting the power drive to the slide member with said shaft cantilevered therefrom; and
   positioning means for causing a saw blade mounted to the shaft to cut an elongated veneer edge in a workpiece, said positioning means comprising means forming a portion of said mounting means for positioning the axis of said power drive shaft at an angle of approximately 15° to said slide plane and at an angle to the direction of guided movement of the slide member on the track member, said positioning means comprising means for positioning said axis at a single preselected acute angle to the direction of guided movement of the slide member on the track member, said mounting means comprising clamp means permitting axial adjusting of the power drive therein.

17. A cutting tool mechanism comprising:
   a slide member defining a flat slide plane;
   a track member for slidably guiding the slide member along a preselected path;
   a saw having a power drive, a drive shaft driven by the power drive, and means at the distal end of the shaft for coaxially mounting a rotary saw blade thereto;
   mounting means for mounting the power drive to the slide member with said shaft cantilevered therefrom; and
   positioning means for causing a saw blade mounted to the shaft to cut an elongated veneer edge in a workpiece, said positioning means comprising means forming a portion of said mounting means for positioning the axis of said power drive shaft at an angle of approximately 15° to said slide plane and at an angle to the direction of guided movement of the slide member on the track member, said positioning means comprising means for positioning said axis at a single preselected acute angle to the direction of guided movement of the slide member on the track member, said positioning means comprising means for positioning said axis at a single preselected angle to said slide plane.

18. A cutting tool mechanism comprising:

a slide member defining a flat slide plane;

a track member for slidably guiding the slide member along a preselected path;

a saw having a power drive, a drive shaft driven by the power drive, and means at the distal end of the shaft for coaxially mounting a rotary saw blade thereto;

mounting means for mounting the power drive to the slide member with said shaft cantilevered therefrom; and positioning means for causing a saw blade mounted to the shaft to cut an elongated veneer edge in a workpiece, said positioning means comprising means forming a portion of said mounting means for positioning the axis of said power drive shaft at an angle of approximately 15° to said slide plane and at an angle to the direction of guided movement of the slide member on the track member, said mounting means comprising clamp means permitting axial adjustment of the power drive therein and having recess means for accommodating at least one projecting portion of the power drive.

* * * * *